United States Patent
Kokubu et al.

(10) Patent No.: US 9,359,203 B2
(45) Date of Patent: Jun. 7, 2016

(54) METHOD FOR PRODUCING NITROGEN GAS, METHOD FOR SEPARATING GAS AND DEVICE FOR PRODUCING NITROGEN GAS

(71) Applicant: TAIYO NIPPON SANSO CORPORATION, Tokyo (JP)

(72) Inventors: Makiya Kokubu, Osaka (JP); Hidehisa Sakamoto, Kofu (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 107 days.

(21) Appl. No.: 14/356,456

(22) PCT Filed: Nov. 9, 2012

(86) PCT No.: PCT/JP2012/079119
§ 371 (c)(1),
(2) Date: May 6, 2014

(87) PCT Pub. No.: WO2013/069768
PCT Pub. Date: May 16, 2013

(65) Prior Publication Data
US 2014/0326139 A1    Nov. 6, 2014

(30) Foreign Application Priority Data
Nov. 10, 2011    (JP) .................................. 2011-246604

(51) Int. Cl.
*B01D 53/04* (2006.01)
*C01B 21/04* (2006.01)
(Continued)

(52) U.S. Cl.
CPC .......... *C01B 21/0461* (2013.01); *B01D 53/047* (2013.01); *C01B 21/045* (2013.01);
(Continued)

(58) Field of Classification Search
CPC ............... B01D 53/047; B01D 53/053; B01D 2253/102; B01D 2253/116; B01D 2256/10; B01D 2257/104; B01D 2259/40013; B01D 2259/4002; B01D 2259/40028; B01D 2259/40035; B01D 2259/40043; B01D 2259/40064; B01D 2259/402; B01D 2259/403; B01D 2259/414; C01B 21/045; C01B 21/0455; C01B 21/0461; C01B 2210/0045
USPC ......... 95/96, 138, 148, 903; 96/108, 121, 132
See application file for complete search history.

(56) References Cited

U.S. PATENT DOCUMENTS

| 4,848,985 A | * | 7/1989 | Sadkowski | B01D 53/047 95/100 |
| 5,738,709 A | * | 4/1998 | Lee | B01D 53/047 95/105 |
| 5,906,673 A | * | 5/1999 | Reinhold, III | B01D 53/047 95/103 |

FOREIGN PATENT DOCUMENTS

| JP | 51-050298 | 5/1976 |
| JP | 53-77878 | 7/1978 |

(Continued)

OTHER PUBLICATIONS

Korean office action in application No. 10-2014-7012202 mailed Jul. 16, 2015 (w/translation).

(Continued)

*Primary Examiner* — Frank Lawrence
(74) *Attorney, Agent, or Firm* — Nixon & Vanderhye P.C.

(57) ABSTRACT

A method for producing nitrogen gas from a raw material gas using a PSA system, the method including using a second adsorbent, which is packed in an auxiliary adsorption tank provided in a line connecting two main adsorption tanks packed with a first adsorbent, to reduce the oxygen concentration within a recovered gas discharged from the main adsorption tank performing a depressurization equalization step, and then introducing the gas into the main adsorption tank performing a pressurization equalization step.

12 Claims, 9 Drawing Sheets

(51) Int. Cl.
*B01D 53/047* (2006.01)
*B01D 53/053* (2006.01)

(52) U.S. Cl.
CPC ........... *C01B21/0455* (2013.01); *B01D 53/053* (2013.01); *B01D 2253/102* (2013.01); *B01D 2253/116* (2013.01); *B01D 2256/10* (2013.01); *B01D 2257/104* (2013.01); *B01D 2259/4002* (2013.01); *B01D 2259/402* (2013.01); *B01D 2259/403* (2013.01); *B01D 2259/40013* (2013.01); *B01D 2259/40028* (2013.01); *B01D 2259/40035* (2013.01); *B01D 2259/40043* (2013.01); *B01D 2259/40062* (2013.01); *B01D 2259/414* (2013.01); *C01B 2210/0045* (2013.01)

(56) References Cited

FOREIGN PATENT DOCUMENTS

| | | |
|---|---|---|
| JP | 5-103937 | 4/1993 |
| JP | 6-154536 | 6/1994 |
| JP | 2011-156530 | 8/2011 |
| KR | 20080077107 A | 8/2008 |

OTHER PUBLICATIONS

International Search Report for PCT/JP2012/079119 mailed Jan. 22, 2013.
Written Opinion of the International Searching Authority mailed Jan. 22, 2013 (foreign language).
S. Sircar, "Separation Science and Technology", 23, (14 & 15), pp. 2379-2396, 1988.

\* cited by examiner

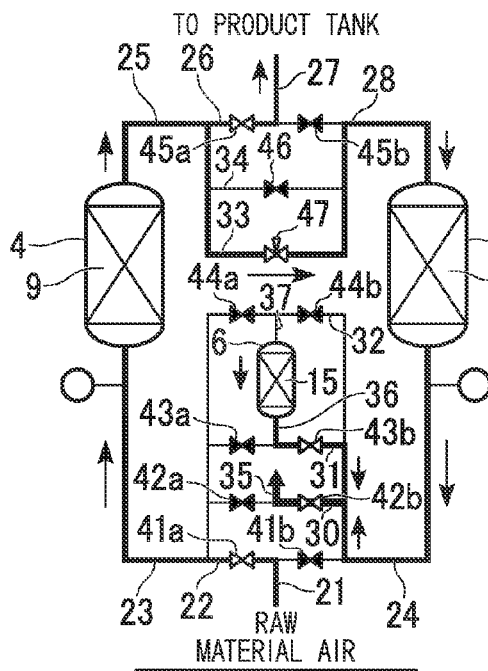
FIG. 2A OPERATION 1 FLOW
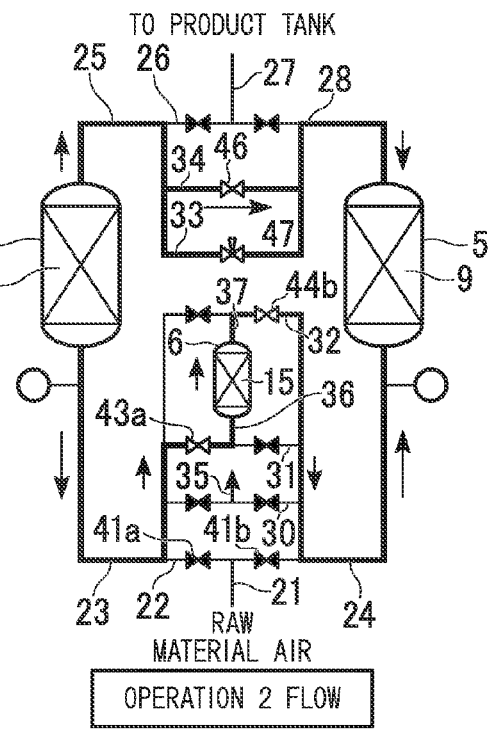
FIG. 2B OPERATION 2 FLOW
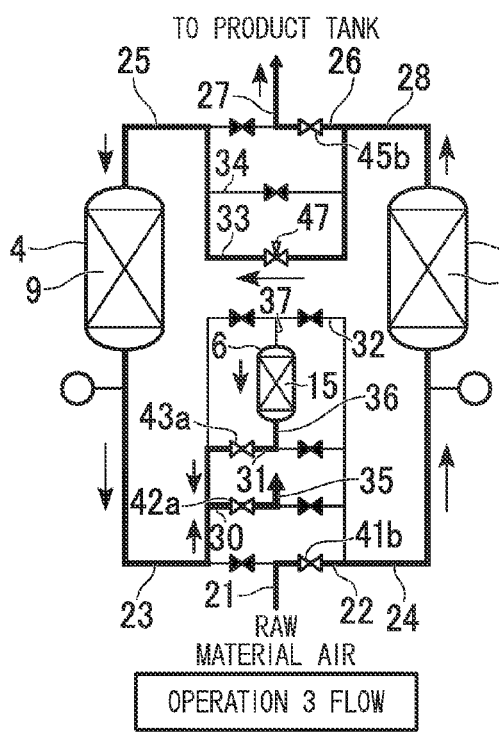
FIG. 2C OPERATION 3 FLOW
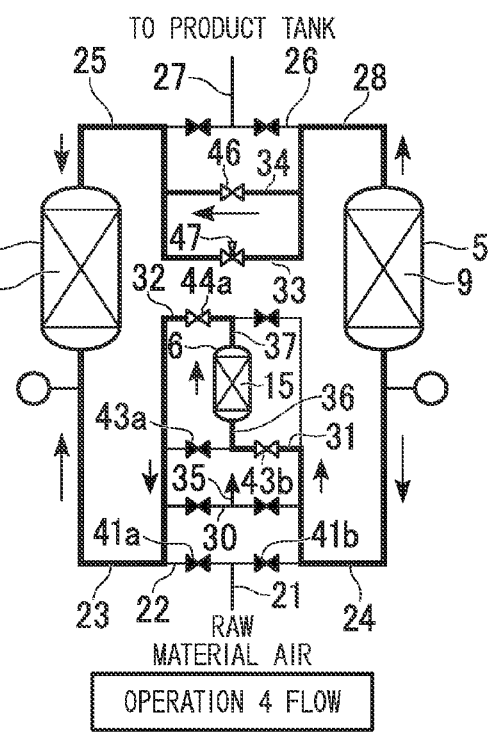
FIG. 2D OPERATION 4 FLOW

OPERATION 1 FLOW

OPERATION 2 FLOW

OPERATION 3 FLOW

OPERATION 4 FLOW

PRIOR ART

METHOD FOR PRODUCING NITROGEN GAS, METHOD FOR SEPARATING GAS AND DEVICE FOR PRODUCING NITROGEN GAS

This application is the U.S. national phase of International Application No. PCT/JP 2012/079119 filed 9 Nov. 2012 which designated the U.S. and claims priority to JP 2011-246604 filed 10 Nov. 2011, the entire contents of each of which are hereby incorporated by reference.

TECHNICAL FIELD

The present invention relates to a method for producing nitrogen gas, a method for separating gas, and a device for producing nitrogen gas. Priority is claimed on Japanese Patent Application No. 2011-246604, filed Nov. 10, 2011, the content of which is incorporated herein by reference.

BACKGROUND ART

Generally, devices for producing nitrogen gas by the pressure swing adsorption (PSA) method (namely, nitrogen PSA devices) are used in many applications as simple nitrogen gas supply devices. In recent years, in response to user needs, further reductions in the electric power consumption and space requirements are being demanded of these types of devices for producing nitrogen gas.

Conventionally, known examples of these types of devices for producing nitrogen gas include the device described below. FIG. 9 is a diagram illustrating one example of a conventional device for producing nitrogen gas.

As illustrated in FIG. 9, a device 101 for producing nitrogen gas includes a compressor 102, two adsorption tanks (a first adsorption tank 103 and a second adsorption tank 104), a product tank 105, automatic switching on-off valves 111a, 111b, 112a, 112b, 113a, 113b, 114 and 115 provided at the inlet and outlet of each of the adsorption tanks, a flow regulating valve 116 and a product gas outlet valve 117.

The compressor 102 is a device for compressing the raw material gas (air). Further, the two adsorption tanks 103 and 104 are packed with an adsorbent 109 that preferentially adsorbs the oxygen within the raw material gas. In each of the adsorption tanks 103 and 104, the oxygen within the raw material gas is adsorbed and removed, yielding a product gas rich in nitrogen.

Further, the first adsorption tank 103 and the second adsorption tank 104 are connected via lines provided at the downstream side and upstream side of the respective tanks.

Here, the expression "upstream side of the tank" refers to the lower side (the raw material gas inlet side) of the tank, whereas the expression "downstream side of the tank" refers to the upper side (the product gas outlet side) of the tank, which represents a downstream position in terms of the flow of the raw material gas.

The product tank 105 is provided on the downstream side of the two adsorption tanks 103 and 104, and is connected to the first adsorption tank 103 via the on-off valve 113a, and to the second adsorption tank 104 via the on-off valve 113b.

One known method for separating nitrogen gas from a raw material gas using this type of PSA device 101 for producing nitrogen gas is a method that involves repeating a pressurization and adsorption step, a depressurization and equalization step, a depressurization and regeneration step, and a pressurization and equalization step.

In the PSA method, the first adsorption tank 103 and the second adsorption tank 104 adopt a relationship such that when one is performing the pressurization and adsorption step, the other is performing the depressurization and regeneration step, and when one is performing the depressurization and equalization step, the other is performing the pressurization and equalization step. Accordingly, in the first adsorption tank 103, when the pressurization and adsorption step, the depressurization and equalization step, the depressurization and regeneration step, and the pressurization and equalization step are performed in that order, in the second adsorption tank 104, the steps are performed in the order of the depressurization and regeneration step, the pressurization and equalization step, the pressurization and adsorption step, and the depressurization and equalization step. The following description describes the steps for the first adsorption tank 103.

First, in the pressurization and adsorption step, the raw material gas that has been pressurized by the compressor 102 is fed into the first adsorption tank 103, the inside of the first adsorption tank 103 is pressurized, and the oxygen within the raw material gas is adsorbed preferentially by the adsorbent 109, yielding a gas rich in nitrogen.

Next, in the depressurization and equalization step, residual gas inside the first adsorption tank 103 is introduced into the second adsorption tank 104.

Subsequently, in the depressurization and regeneration step, the first adsorption tank 103 is opened to the atmosphere, thereby reducing the pressure, desorbing the oxygen from the adsorbent 109 and regenerating the adsorbent 109.

In the pressurization and equalization step, gas is introduced into the first adsorption tank 103 from the second adsorption tank 104.

In a more detailed description based on FIG. 9, when the first adsorption tank 103 is performing the pressurization and adsorption step, the on-off valves 111a and 113a are open, and the other on-off valves are closed.

Accordingly, the raw material gas that has been pressurized by the compressor 102 passes through the on-off valve 111a and is fed into the first adsorption tank 103.

In the first adsorption tank 103, the oxygen within the raw material gas is adsorbed by the adsorbent 109, and the resulting nitrogen-rich product gas passes through the on-off valve 113a and is introduced into the product tank 105.

A portion of the product gas discharged from the first adsorption tank 103 passes through the flow regulating valve 116 and into the second adsorption tank 104, where it is used for regenerating the adsorbent 109. As time passes, the region of the adsorbent in which the oxygen adsorption occurs shifts closer to the product outlet end, and therefore after a prescribed time, the pressurization and adsorption step is halted.

Subsequently, when the first adsorption tank 103 enters the depressurization and equalization step and the second adsorption tank 104 enters the pressurization and equalization step, the on-off valves 114 and 115 are opened, and the other on-off valves are closed.

In this step, the gas (pressure equalization gas) inside the first adsorption tank 103, which is under relatively high pressure and, although not satisfying final product quality, is a comparatively nitrogen-rich gas, is supplied from the first adsorption tank 103 to the second adsorption tank 104 through the on-off valves 114 and 115.

This method in which, in the manner described above, gas is introduced from the product gas outlet side (upper side) of the first adsorption tank 103 into the product gas outlet side (upper side) of the second adsorption tank 104, and from the raw material gas inlet side (lower side) of the first adsorption tank 103 into the raw material gas inlet side (lower side) of the second adsorption tank 104 is termed an upper-lower simultaneous pressure equalization method. This type of upper-lower simultaneous pressure equalization method is disclosed, for example, in Non-Patent Document 1 and Patent Document 1.

Next, by opening the on-off valve 112a of the first adsorption tank 103, the first adsorption tank 103 enters the depressurization and regeneration step. In the depressurization and regeneration step, residual gas inside the tank is released into the atmosphere from the on-off valve 112a, and as the pressure inside the tank decreases, the oxygen adsorbed to the adsorbent 109 desorbs. At this time, a portion of the product gas discharged from the second adsorption tank 104 passes through the flow regulating valve 116 and into the interior of the first adsorption tank 103, and is used for purging the inside of the tank and regenerating the adsorbent 109.

Subsequently, by opening the on-off valves 114 and 115, and closing the other on-off valves, the first adsorption tank 103 enters the pressurization and equalization step, and the second adsorption tank 104 enters the depressurization and equalization step. In this step, the gas (pressure equalization gas) inside the second adsorption tank 104, which is under relatively high pressure and, although not satisfying final product quality, is a comparatively nitrogen-rich gas, is supplied from the second adsorption tank 104 to the first adsorption tank 103.

By repeating the above steps, nitrogen gas is separated from the raw material gas.

Patent Document 2 discloses a device for producing nitrogen gas which improves the basic device for producing nitrogen gas described above and increases the amount of product nitrogen generated. This device for producing nitrogen gas is provided with the two adsorption tanks, and another adsorption tank (hereafter called the "pressure equalization adsorption tank"), which is provided partway along the pressure equalization line provided on the product outlet side of the two adsorption tanks, and is used for adsorbing oxygen molecules within the pressure equalization gas.

DOCUMENTS OF RELATED ART

Patent Documents

Patent Document 1: Japanese Unexamined Patent Application, First Publication No. Sho 51-50298
Patent Document 2: Japanese Unexamined Patent Application, First Publication No. Hei 5-103937

Non-Patent Documents

Non-Patent Document 1: Separation Science and Technology, 23, 2379 (1988)

SUMMARY OF THE INVENTION

Problems to be Solved by the Invention

However, in recent years there have been growing demands for further miniaturization of the devices, improved nitrogen gas yield and improved power conservation for the type of conventional PSA method for producing nitrogen gas described above, although no suitable method has yet been proposed.

In Patent Document 2, a device for producing nitrogen gas which includes a pressure equalization adsorption tank is disclosed, but although the document states that the device enables the amount of high-purity nitrogen gas produced to be increased compared with conventional devices, no specific description is provided in relation to the product nitrogen concentration or the increased amount of production.

Means to Solve the Problems

In order to address the issues outlined above, the present invention provides the aspects described below.

(1) A method for producing nitrogen gas from a raw material gas (air) using a PSA system, the method involving using a second adsorbent, which is packed in an auxiliary adsorption tank provided in a line connecting two main adsorption tanks packed with a first adsorbent, and has a faster oxygen adsorption rate than the first adsorbent, to reduce the oxygen concentration within a gas discharged from a main adsorption tank performing a depressurization equalization step, and then introducing the gas into a main adsorption tank performing a pressurization equalization step.

(2) The method for producing nitrogen gas disclosed in (1) above, wherein the line connecting the two main adsorption tanks is a line connecting either the upstream side of each of the main adsorption tanks, or an intermediate section of one main adsorption tank and the upstream side of the other main adsorption tank.

(3) The method for producing nitrogen gas disclosed in (1) of (2) above, wherein the first adsorbent packed in the main adsorption tanks is carbon molecular sieves.

(4) The method for producing nitrogen gas disclosed in any one of (1) to (3) above, wherein the second adsorbent packed in the auxiliary adsorption tank is carbon molecular sieves.

(5) A method for producing nitrogen gas from a raw material gas using a PSA system, the method including a pressure equalization step of connecting two main adsorption tanks, each packed with an adsorbent, via a line that connects either the upstream side of each of the main adsorption tanks or an intermediate section of one main adsorption tank and the upstream side of the other main adsorption tank, and using the line to achieve pressure equalization by discharging a gas from one main adsorption tank into the other main adsorption tank, wherein in the pressure equalization step, the gas discharged from one main adsorption tank is subjected to a reduction in oxygen concentration by an oxygen removal device before entering the other main adsorption tank.

(6) A method for separating gas which uses a raw material gas containing an easily adsorbed component which adsorbs readily to a first adsorbent and a second adsorbent and a poorly adsorbed component which exhibits poor adsorption to the adsorbents, and recovers the easily adsorbed component and the poorly adsorbed component from the raw material gas, wherein the method includes a pressure equalization step of connecting two main adsorption tanks packed with the first adsorbent via a line, and using the line to achieve pressure equalization by discharging a gas from one main adsorption tank into the other main adsorption tank, and in the pressure equalization step, the gas discharged from one main adsorption tank is subjected to a reduction in the easily adsorbed component by the second adsorbent, which is packed in an auxiliary adsorption tank provided in the line and has a faster adsorption rate of the easily adsorbed component than the first adsorbent, and is then introduced into the other main adsorption tank.

(7) A device for producing nitrogen gas from a raw material gas using a PSA system, the device containing a compressor which pressurizes the raw material gas, two main adsorption tanks packed with a first adsorbent, and an auxiliary adsorption tank which is provided in a line connecting the two main adsorption tanks and is packed with a second adsorbent for reducing the oxygen concentration within a gas, wherein the oxygen adsorption rate of the second adsorbent is faster than the oxygen adsorption rate of the first adsorbent.

(8) The device for producing nitrogen gas disclosed in (7) above, wherein the line connecting the two main adsorption tanks is a line connecting either the upstream side of each of the main adsorption tanks, or an intermediate section of one main adsorption tank and the upstream side of the other main adsorption tank.

(9) The device for producing nitrogen gas disclosed in (7) of (8) above, wherein the first adsorbent packed in the main adsorption tanks is carbon molecular sieves.

(10) The device for producing nitrogen gas disclosed in any one of (7) to (9) above, wherein the second adsorbent packed in the auxiliary adsorption tank is carbon molecular sieves.

Effects of the Invention

According to the present invention, the amount of adsorbent packed in the main adsorption tanks can be reduced, enabling the size of the device for producing nitrogen gas to be reduced. Further, the yield of nitrogen gas can be increased, resulting in reduced power consumption for the device for producing nitrogen gas

BRIEF DESCRIPTION OF THE DRAWINGS

FIG. 2A is a process diagram showing the flow during an operation 1 of a method for producing nitrogen gas according to the first embodiment of the present invention.

FIG. 2B is a process diagram showing the flow during an operation 2 of the method for producing nitrogen gas according to the first embodiment of the present invention.

FIG. 2C is a process diagram showing the flow during an operation 3 of the method for producing nitrogen gas according to the first embodiment of the present invention.

FIG. 2D is a process diagram showing the flow during an operation 4 of the method for producing nitrogen gas according to the first embodiment of the present invention.

EMBODIMENTS FOR CARRYING OUT THE INVENTION

A device for producing nitrogen gas and a method for producing nitrogen gas according to the present invention are described below in detail using the drawings.
(First Embodiment)
A first embodiment of the present invention is described below.
<Device for Producing Nitrogen Gas>

Figure 1:
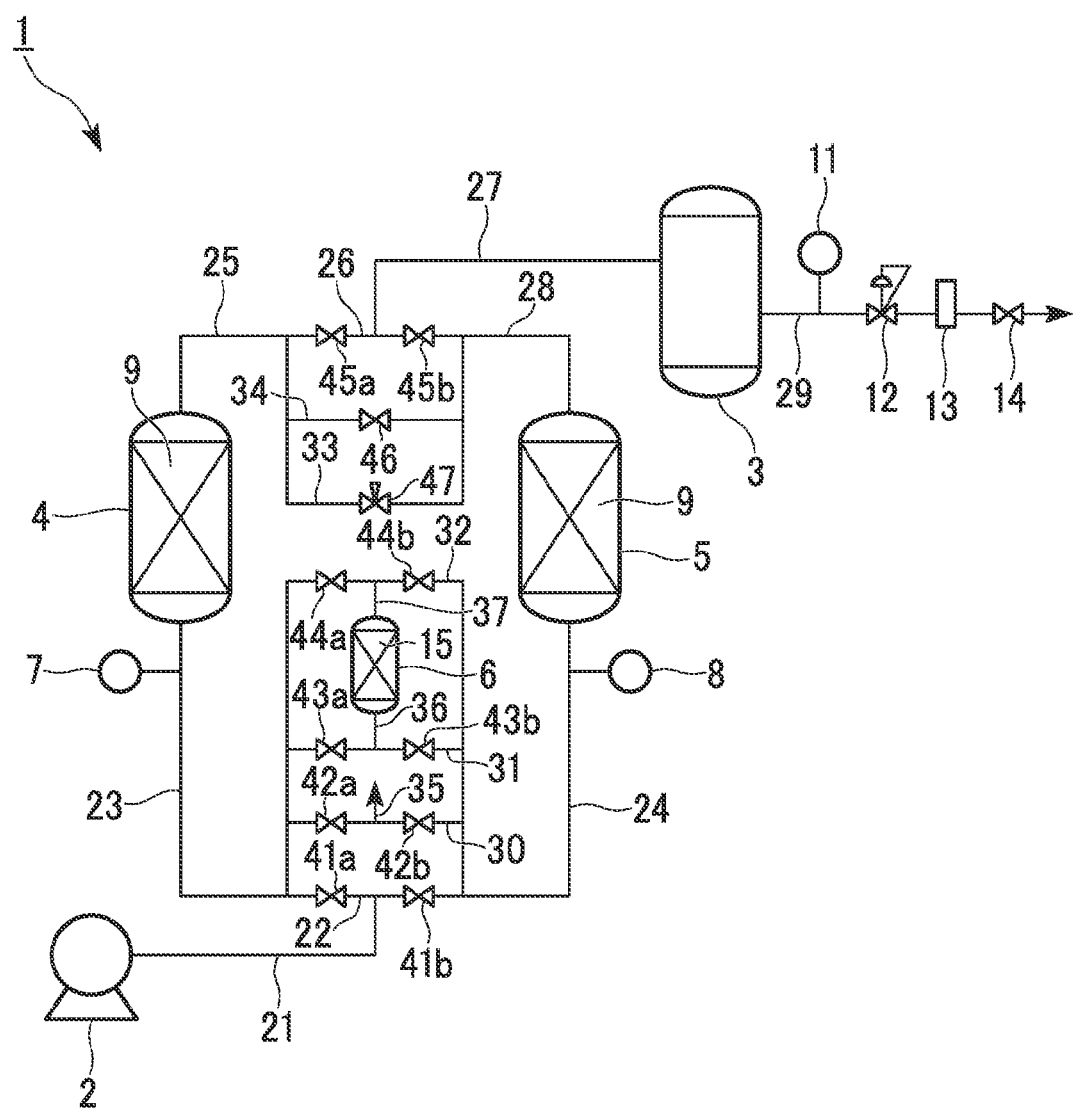
FIG. 1 is a system diagram illustrating an outline of a device for producing nitrogen gas according to a first embodiment of the present invention.

A device 1 for producing nitrogen gas according to the present invention is a PSA production device, and as illustrated in FIG. 1, is composed basically of a compressor 2, a first main adsorption tank 4, a second main adsorption tank 5, an auxiliary adsorption tank 6, and a product tank 3.

The compressor 2 is a device which compresses the raw material gas (air), and is connected to the first main adsorption tank 4 through an inlet valve 41a and lines 21, 22 and 23, and to the second main adsorption tank 5 through an inlet valve 41b and lines 21, 22 and 24.

Further, the first main adsorption tank 4 and the second main adsorption tank 5 are packed with an adsorbent 9 (first adsorbent) which adsorbs the oxygen within the raw material gas preferentially to the nitrogen. This adsorbent 9 preferably uses carbon molecular sieves.

A carbon molecular sieve has a property wherein the equilibrium adsorption capacities for oxygen and nitrogen are substantially equal, but because of its smaller molecular diameter, oxygen is adsorbed at a faster adsorption rate than nitrogen. By selecting an appropriate cycle time in accordance with the type of a carbon molecular sieve being used, nitrogen can be selectively concentrated and separated.

In general, adsorbents having a fast adsorption rate are more suited to short cycle operations, and therefore exhibit high nitrogen gas productivity. Adsorbents having a slow adsorption rate exhibit a greater difference in the adsorption rates for oxygen and nitrogen, and therefore produce a comparatively large separation ratio (nitrogen gas yield), enabling a higher nitrogen gas yield.

In other words, the nitrogen productivity and the separation ratio exist in a trade-off relationship, and PSA device makers select various commercially available carbon molecular sieves based on their own judgment.

The product tank 3 is a tank for storing the nitrogen gas discharged from the first main adsorption tank 4 and the second main adsorption tank 5, and is connected to the first main adsorption tank 4 through an outlet valve 45a and lines 25, 26 and 27, and to the second main adsorption tank 5 through an outlet valve 45b and lines 28, 26 and 27.

The nitrogen gas which represents the product gas stored in the product tank 3 is discharged through a line 29 in which a product gas outlet valve 14 is provided.

Further, the upstream side and the downstream side of the first main adsorption tank 4 are connected to the upstream side and the downstream side respectively of the second main adsorption tank 5.

The upstream side of the first main adsorption tank 4 and the upstream side of the second main adsorption tank 5 are connected via the line 23 and the line 24, and the line 23 and the line 24 are connected by four lines 22, 30, 31 and 32.

The inlet valves 41a and 41b are provided in the line 22, and a line 21 is connected to the line 22 between these inlet valves 41a and 41b. Further, exhaust valves 42a and 42b are provided in the line 30, and a line 35 that leads to the open air is connected to the line 30 between these exhaust valves 42a and 42b.

Auxiliary adsorption tank inlet valves 43a and 43b are provided in the line 31, and a line 36 is connected to the line 31 between the auxiliary adsorption tank inlet valve 43a and the auxiliary adsorption tank inlet valve 43b. Further, auxiliary adsorption tank outlet valves 44a and 44b are connected to the line 32, and a line 37 is connected to the line 32 between the auxiliary adsorption tank outlet valve 44a and the auxiliary adsorption tank outlet valve 44b.

The line 36 is connected to the upstream side of the auxiliary adsorption tank 6, and the line 37 is connected to the downstream side of the auxiliary adsorption tank 6. The auxiliary adsorption tank 6 is packed with an adsorbent 15 (second adsorbent) which adsorbs oxygen preferentially to nitrogen. The oxygen adsorption rate of this second adsorbent is faster than that of the first adsorbent.

Further, the downstream side of the first main adsorption tank 4 and the downstream side of the second main adsorption tank 5 are connected via the line 25 and the line 28, and the line 25 and the line 28 are connected by two lines 33 and 34. A pressure equalizing valve 46 is provided in the line 34, and a flow regulating valve 47 which regulates the flow rate of the regeneration gas is provided in the line 33.

The outlet valves 45a and 45b are provided in the line 26, and a line 27 is connected to the line 26 between these outlet valves 45a and 45b.

<Method for Producing Nitrogen Gas>

Next is a description of a method for producing nitrogen gas according to the present embodiment.

The method for producing nitrogen gas according to the present embodiment is a method that involves repeating a pressurization and adsorption step, a depressurization and equalization step, a depressurization and regeneration step, and a pressurization and equalization step.

The first main adsorption tank 4 and the second main adsorption tank 5 adopt a relationship such that when one is performing the pressurization and adsorption step, the other is performing the depressurization and regeneration step, and when one is performing the depressurization and equalization step, the other is performing the pressurization and equalization step. Accordingly, when the pressurization and adsorption step, the depressurization and equalization step, the depressurization and regeneration step, and the pressurization and equalization step are performed in that order in the first main adsorption tank 4, in the second main adsorption tank 5, the depressurization and regeneration step, the pressurization and equalization step, the pressurization and adsorption step, and the depressurization and equalization step are performed in order. The following description focuses on the steps performed in the first main adsorption tank 4.

In the pressurization and adsorption step, the raw material gas that has been pressurized to an appropriate pressure by the compressor 2 is fed into the first main adsorption tank 4, the inside of the first main adsorption tank 4 is adjusted to a prescribed pressure, and the readily adsorbed oxygen within the raw material gas is adsorbed preferentially to the adsorbent 9, while the poorly adsorbed nitrogen is discharged into the product tank 3.

In the depressurization and equalization step, residual gas inside the first main adsorption tank 4 is introduced into the second main adsorption tank 5.

In the depressurization and regeneration step, the first main adsorption tank 4 is opened to the atmosphere, thereby reducing the pressure, desorbing the oxygen adsorbed to the adsorbent 9 and regenerating the adsorbent 9.

In the pressurization and equalization step, gas is introduced into the first main adsorption tank 4 from the second main adsorption tank 5.

The first main adsorption tank 4 then shifts to the pressurization and adsorption step again, and by repeating the steps described above, nitrogen gas is separated from the raw material gas. In other words, by repeating the steps of adsorption and regeneration in an alternating manner in the first main adsorption tank 4 and the second main adsorption tank 5, nitrogen gas is produced continuously from the raw material gas.

The method for producing nitrogen gas using the device 1 for producing nitrogen described above is described below in further detail with reference to FIG. 2 and Table 1.

FIG. 2A, FIG. 2B, FIG. 2C and FIG. 2D are diagrams illustrating the steps of an operation 1, an operation 2, an operation 3 and an operation 4 respectively, and in these figures, arrows indicate the direction of gas flow, and the bold lines indicate the lines through which the gas is flowing. Further, Table 1 illustrates the relationships between each of the steps in the first main adsorption tank 4, the second main adsorption tank 5 and the auxiliary adsorption tank 6.

TABLE 1

| Tank name | Operation 1 | Operation 2 | Operation 3 | Operation 4 |
| --- | --- | --- | --- | --- |
| First main adsorption tank | Pressurization (adsorption) | Depressurization equalization | Depressurization (regeneration) | Pressurization equalization |
| Second main adsorption tank | Depressurization (regeneration) | Pressurization equalization | Pressurization (adsorption) | Depressurization equalization |
| Auxiliary adsorption tank | Depressurization (regeneration) | Pressurization (adsorption) | Depressurization (regeneration) | Pressurization (adsorption) |

In the operation 1 illustrated in FIG. 2A, the pressurization and adsorption step is performed in the first main adsorption tank 4, the depressurization and regeneration step is performed in the second main adsorption tank 5, and the depressurization and regeneration step is performed in the auxiliary adsorption tank 6.

In the operation 1, the inlet valve 41a, the outlet valve 45a, the exhaust valve 42b and the auxiliary adsorption tank inlet valve 43b are open, the flow rate of the gas flowing from the downstream side of the first main adsorption tank 4 to the downstream side of the second main adsorption tank 5 is controlled appropriately by the flow regulating valve 47, and the other on-off valves are closed.

In this operation 1, because the inlet valve 41a is open, the raw material gas that has been compressed by the compressor 2 passes through the lines 21, 22 and 23 and into the first main adsorption tank 4, thereby pressurizing the inside of the first main adsorption tank 4.

Inside the first main adsorption tank 4, the readily adsorbed oxygen within the raw material gas is adsorbed preferentially to the adsorbent 9, and the poorly adsorbed nitrogen is discharged from the first main adsorption tank 4.

Because the outlet valve 45a is open, the nitrogen gas discharged from the first main adsorption tank 4 passes through the lines 25, 26 and 27 and into the product tank 3.

Meanwhile, in the second main adsorption tank 5, because the exhaust valve 42b is open, the gas inside the second main adsorption tank 5 passes through the lines 24, 30 and 35 and is released into the atmosphere, thereby reducing the pressure inside the second main adsorption tank 5 (depressurization).

In addition, a portion of the nitrogen gas discharged from the first main adsorption tank 4 passes through the line 33, at a desired flow rate controlled by the flow regulating valve 47, and enters the second main adsorption tank 5, and this nitrogen gas flushes out the oxygen desorbed from the adsorbent 9 inside the second main adsorption tank 5, thereby accelerating the regeneration of the adsorbent 9 (purge regeneration).

At this time, because the auxiliary adsorption tank inlet valve 43b is open, the gas inside the auxiliary adsorption tank 6 passes through the lines 36, 31, 30 and 35 and is released into the atmosphere, thereby reducing the pressure inside the auxiliary adsorption tank 6 (depressurization) and causing regeneration of the adsorbent 15.

Next, in the operation 2 illustrated in FIG. 2B, the depressurization and equalization step is performed in the first main adsorption tank 4, the pressurization and equalization step is performed in the second main adsorption tank 5, and the pressurization and adsorption step is performed in the auxiliary adsorption tank 6.

In this operation 2, the gas inside the first main adsorption tank 4, which has completed the pressurization and adsorption step, meaning the pressure inside the tank is relatively high, is recovered in the second main adsorption tank 5, which has completed the depressurization and regeneration step, meaning the pressure inside the tank is relatively low, and as a result, the first main adsorption tank 4 undergoes depressurization, while the second main adsorption tank 5 and the auxiliary adsorption tank 6 are pressurized.

In the operation 2, the auxiliary adsorption tank inlet valve 43a, the auxiliary adsorption tank outlet valve 44b and the pressure equalizing valve 46 are open, and the other on-off valves are closed.

The gas inside the first main adsorption tank 4 passes from the downstream side of the first main adsorption tank 4, through the lines 25, 34 and 28, and into the downstream side of the second main adsorption tank 5.

Because the flow rate is regulated by the flow regulating valve 47, the majority of the gas discharged from the first main adsorption tank 4 does not pass through the line 33, but rather passes through the line 34 and into the second main adsorption tank 5.

Because the auxiliary adsorption tank inlet valve 43a and the auxiliary adsorption tank outlet valve 44b are open, the gas inside the first main adsorption tank 4 also flows from the upstream side of the first main adsorption tank 4, via the lines 23, 31 and 36, through the auxiliary adsorption tank 6, and then via the lines 37, 32 and 24 into the upstream side of the second main adsorption tank 5.

In a nitrogen separation process using the PSA system, the gas that exists near the product gas outlet of the adsorption tank when the pressurization and adsorption step is halted has a composition close to the lower limit required for product quality. On the other hand, the gas that exists near the raw material gas inlet has substantially the same composition as air. The concentration of the nitrogen distributed inside the adsorption tank forms a concentration distribution from the product gas outlet toward the raw material gas inlet.

The gas discharged from the downstream side of the first main adsorption tank 4 is a gas that has already undergone oxygen adsorption by the adsorbent 9 inside the first main adsorption tank 4, and therefore, although not satisfying final product quality, is a nitrogen gas of comparatively high purity. However, the gas discharged from the upstream side of the first main adsorption tank 4 has yet to undergo sufficient reduction in the oxygen concentration by the adsorbent 9, and can therefore be thought of as a gas having a nitrogen concentration close to that of air.

When the gas of relatively low nitrogen concentration discharged from the upstream side of the first main adsorption tank 4 is introduced at the upstream side of the auxiliary adsorption tank 6, the inside of the auxiliary adsorption tank 6 is pressurized, and the oxygen within the low-purity nitrogen gas is adsorbed by the adsorbent 15 (oxygen removal device) packed inside the auxiliary adsorption tank 6, thereby reducing the oxygen concentration.

As a result, the gas (recovered gas) discharged from the downstream side of the auxiliary adsorption tank 6 and introduced at the upstream side of the second main adsorption tank 5 becomes a nitrogen gas of high purity, meaning contamination of the second main adsorption tank 5 by low-purity nitrogen gas can be prevented.

The speed of the gas (flow rate) passed through the auxiliary adsorption tank 6 can be optimized by altering the orifice or the like.

Because increasing the size of the auxiliary adsorption tank 6 also produces adverse effects such as increasing equipment costs, and reducing the amount of gas recovered in each of the main adsorption tanks 4 and 5 due to the increase in the amount of gas retained inside the auxiliary adsorption tank 6, these factors should also be considered when determining the size of the auxiliary adsorption tank 6.

Further, the gas flowing through the auxiliary adsorption tank 6 has a faster flow rate than the raw material gas flowing through each of the main adsorption tanks 4 and 5, and therefore the contact time with the adsorbent 15 is short. In other words, the adsorbent 15 packed in the auxiliary adsorption tank 6 exhibits a different adsorption operation to that of the main adsorption tanks 4 and 5, with the adsorption operation occurring during the short pressure equalization period and at a fast flow rate.

Accordingly, the adsorbent 15 packed in the auxiliary adsorption tank 6 preferably exhibits a faster oxygen adsorption rate than the adsorbent 9 packed in each of the main adsorption tanks 4 and 5.

An adsorbent for which the oxygen adsorption rate has been adjusted using the type of method described below can be used as this type of adsorbent 15.

A carbon molecular sieve is generally produced by bringing a porous carbon material into contact with an inert gas containing hydrocarbons such as benzene and toluene for a period of several minutes to several tens of minutes while heating at a temperature of 400 to 900° C., thereby depositing pyrolytic carbon from the hydrocarbons in the entrances to the fine pores within the porous carbon material.

Accordingly, by increasing or decreasing the amount of deposited carbon, materials having fast adsorption rates and materials having slow adsorption rates can be produced. By acquiring a carbon molecular sieve for which the adsorption rate has been adjusted in this manner, and then measuring the adsorption rate, an adsorbent can be selected which has a faster adsorption rate than that of the adsorbent packed in the main adsorption tanks.

Further, the adsorption rate can also be increased by reducing the particle size of the adsorbent.

In other words, examples of the adsorbent having a fast oxygen adsorption rate include adsorbents that have been granulated with a small pellet size, and adsorbents that have been prepared with a large pore size.

Next is a description of the operation 3 illustrated in FIG. 2C. In the operation 3, the roles of the first main adsorption tank 4 and the second main adsorption tank 5 are reversed from the operation 1, so that the depressurization and regeneration step is performed in the first main adsorption tank 4, the pressurization and adsorption step is performed in the second main adsorption tank 5, and the depressurization and regeneration step is performed in the auxiliary adsorption tank 6.

In the operation 3, the inlet valve 41b, the outlet valve 45b, the exhaust valve 42a, and the auxiliary adsorption tank inlet valve 43a are open, and the other on-off valves are closed.

In this operation 3, because the inlet valve 41b is open, the raw material gas that has been compressed by the compressor 2 passes through the lines 21, 22 and 24 and is introduced at the upstream side of the second main adsorption tank 5, thereby pressurizing the inside of the second main adsorption tank 5. Inside the second main adsorption tank 5, the readily adsorbed oxygen within the raw material gas is adsorbed preferentially to the adsorbent 9, and the poorly adsorbed nitrogen is discharged from the downstream side of the second main adsorption tank 5.

Because the outlet valve 45b is open, the nitrogen gas discharged from the second main adsorption tank 5 passes through the lines 28, 26 and 27 and into the product tank 3.

Further, because the exhaust valve 42a is open, the gas inside the first main adsorption tank 4 passes through the lines 23, 30 and 35 and is released into the atmosphere, thereby reducing the pressure inside the first main adsorption tank 4 (depressurization).

In addition, a portion of the nitrogen gas discharged from the downstream side of the second main adsorption tank 5 passes through the lines 28, 33 and 25, at a desired flow rate controlled by the flow regulating valve 47, and enters the first main adsorption tank 4. This nitrogen gas flushes out the oxygen desorbed from the adsorbent 9 inside the first main adsorption tank 4, thereby accelerating the regeneration of the adsorbent 9 (purge regeneration).

Furthermore, because the auxiliary adsorption tank inlet valve 43a is open, the gas inside the auxiliary adsorption tank 6 passes through the lines 36, 31, 30 and 35 and is released into the atmosphere, thereby reducing the pressure inside the auxiliary adsorption tank 6 (depressurization) and causing regeneration of the adsorbent 15.

Next is a description of the operation 4 illustrated in FIG. 2D. In the operation 4, the roles of the first main adsorption tank 4 and the second main adsorption tank 5 are reversed from the operation 2, so that the pressurization and equalization step is performed in the first main adsorption tank 4, the depressurization and equalization step is performed in the second main adsorption tank 5, and the pressurization and adsorption step is performed in the auxiliary adsorption tank 6.

In this operation 4, the gas inside the second main adsorption tank 5, which has completed the pressurization and adsorption step, meaning the pressure inside the tank is relatively high, is recovered in the first main adsorption tank 4, which has completed the depressurization and regeneration step, meaning the pressure inside the tank is relatively low, and as a result, the second main adsorption tank 5 undergoes depressurization, while the first main adsorption tank 4 and the auxiliary adsorption tank 6 are pressurized.

In the operation 4, the auxiliary adsorption tank inlet valve 43b, the auxiliary adsorption tank outlet valve 44a and the pressure equalizing valve 46 are open, and the other on-off valves are closed.

Because the pressure equalizing valve 46 is open, the gas inside the second main adsorption tank 5 passes from the downstream side of the second main adsorption tank 5, through the lines 28, 34 and 25, and into the downstream side of the first main adsorption tank 4.

Because the flow rate is regulated by the flow regulating valve 47, the majority of the gas introduced into the first main adsorption tank 4 does not pass through the line 33, but rather passes through the line 34.

Furthermore, because the auxiliary adsorption tank inlet valve 43b and the auxiliary adsorption tank outlet valve 44a are open, the gas inside the second main adsorption tank 5 also flows from the upstream side of the second main adsorption tank 5, via the lines 24, 31 and 36, through the auxiliary adsorption tank 6, and then via the lines 37, 32 and 23 into the upstream side of the first main adsorption tank 4.

In a similar manner to the operation 2, by introducing the recovered gas discharged from the upstream side of the second main adsorption tank 5 into the upstream side of the auxiliary adsorption tank 6, the auxiliary adsorption tank 6 is pressurized, and the oxygen within the low-purity nitrogen gas is adsorbed by the adsorbent 15 packed inside the auxiliary adsorption tank 6, thereby reducing the oxygen concentration.

As a result, the recovered gas discharged from the downstream side of the auxiliary adsorption tank 6 and introduced at the upstream side of the first main adsorption tank 4 becomes a nitrogen gas of high purity, meaning contamination of the first main adsorption tank 4 by low-purity nitrogen gas can be prevented.

By repeating the operations 1 to 4 described above, the pressurization and adsorption step, the depressurization and equalization step, the depressurization and regeneration step, and the pressurization and equalization step are repeated in each of the main adsorption tanks 4 and 5, thereby separating nitrogen gas from the raw material gas and enabling the product nitrogen gas to be obtained with good efficiency.

In the embodiment described above, the case in which the outlet valves 45a and 45b were on-off valves was described, but check valves may also be used, and the auxiliary adsorption tank outlet valves 44a and 44b may also be check valves. Further, instead of using the flow regulating valve 47, a flow regulation method that involves narrowing the orifice or line diameter may also be used.

By using the device 1 for producing nitrogen gas and the method for producing nitrogen gas according to the present embodiment, the amount of the adsorbent packed in the first main adsorption tank 4 and the second main adsorption tank 5 can be reduced, and the device can be reduced in size. Further, the nitrogen gas yield can be improved, and as a result, the power consumption of the device for producing nitrogen gas can also be reduced.

In other words, in a conventional device for producing nitrogen gas, in the pressurization and equalization step, the recovered gas discharged from the upstream side of one adsorption tank was simply introduced directly into the upstream side of the other adsorption tank.

However, the inventors of the present invention discovered that when the transition was made from the pressurization and adsorption step to the depressurization and equalization step, the nitrogen gas discharged from the upstream side of the adsorption tank contained a large amount of oxygen as an impurity.

Accordingly, in the present embodiment, in the pressurization and equalization step, the nitrogen gas containing a comparatively large amount of oxygen discharged from the upstream side of one of the main adsorption tanks is introduced into the auxiliary adsorption tank 6, where the gas undergoes a reduction in the amount of oxygen by adsorption to the adsorbent packed in the auxiliary adsorption tank 6, before being introduced into the upstream side of the other main adsorption tank.

As a result, contamination of the other main adsorption tank during the pressurization and equalization step can be prevented, meaning the nitrogen gas yield can be improved, the nitrogen gas productivity can be improved, and the amount of adsorbent packed in each of the main adsorption tanks can be reduced.

Generally, the nitrogen gas productivity (the value obtained by dividing the amount of nitrogen gas produced by the amount of adsorbent used in the nitrogen PSA device=productivity) and the nitrogen gas yield act as standards for evaluating the performance of a nitrogen PSA device.

Accordingly, in the present embodiment, because the amount of the adsorbent packed in the main adsorption tanks can be reduced, the embodiment can be said to exhibit excellent nitrogen gas productivity, and because the nitrogen gas yield also improves, the device represents an excellent device for producing nitrogen gas.

Further, the fact that the nitrogen gas yield is high means that even for the same amount of raw material gas, a greater amount of nitrogen can be separated as a product. Alternatively, the same amount of product gas can be produced with a reduced amount of the raw material gas, meaning improved power conservation can be achieved for the air compressor.

The adsorbent 15 packed in the auxiliary adsorption tank 6 in the present embodiment preferably has a faster oxygen adsorption rate than the adsorbent 9 packed in each of the main adsorption tanks 4 and 5. By using this type of adsorbent 15, the effect of the auxiliary adsorption tank 6 in removing oxygen from the recovered gas can be maximized.

However, even if an adsorbent having the same properties as the adsorbent 9 packed in each of the main adsorption tanks 4 and 5 is used, a superior effect can still be obtained compared with the case where no auxiliary adsorption tank 6 is provided.

(Second Embodiment)

Next is a description of a second embodiment of the present invention. The following description focuses on the points of difference from the first embodiment, and descriptions are omitted for those items that are the same as the first embodiment.

<Device for Producing Nitrogen Gas>

Figure 3:
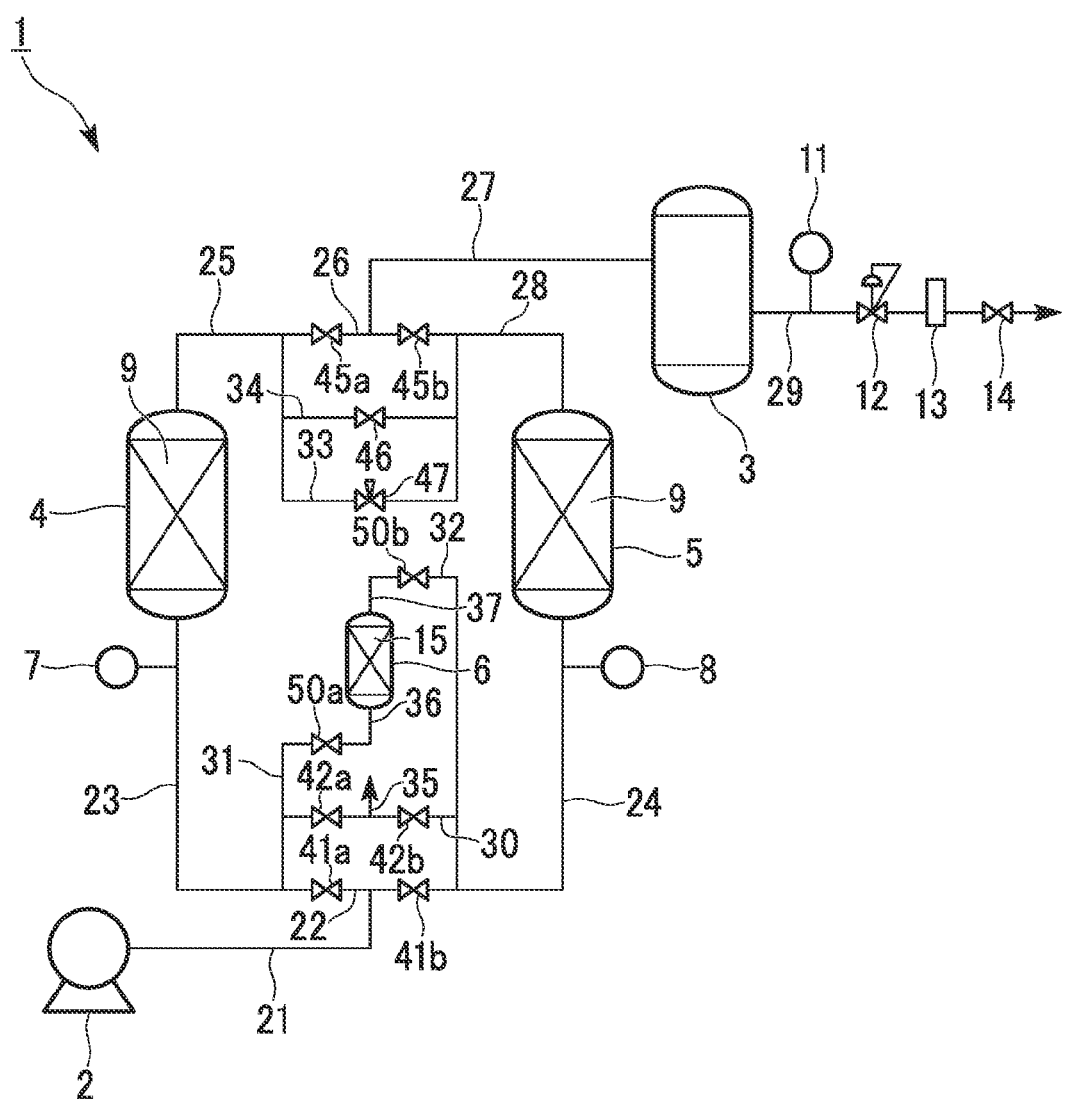
FIG. 3 is a system diagram illustrating an outline of a device for producing nitrogen gas according to a second embodiment of the present invention.

The device 1 for producing nitrogen gas according to the second embodiment of the present invention is a PSA production device, and as illustrated in FIG. 3, is composed basically of the compressor 2, the first main adsorption tank 4, the second main adsorption tank 5, the auxiliary adsorption tank 6, and the product tank 3.

The upstream side of the first main adsorption tank 4 and the upstream side of the second main adsorption tank 5 are connected via the line 23 and the line 24, and the line 23 and the line 24 are connected by three lines, namely the line 22, the line 30, and the lines 31, 36, 37 and 32.

An auxiliary adsorption tank outlet and inlet valve 50a is provided in the line 31, and the line 36 is connected between this auxiliary adsorption tank outlet and inlet valve 50a and the auxiliary adsorption tank. Further, an auxiliary adsorption tank outlet and inlet valve 50b is provided in the line 32, and the line 37 is connected between this auxiliary adsorption tank outlet and inlet valve 50b and the auxiliary adsorption tank.

The auxiliary adsorption tank 6 is packed with the adsorbent 15 (second adsorbent) which adsorbs oxygen preferentially to nitrogen. The oxygen adsorption rate of this second adsorbent is faster than that of the first adsorbent packed in each of the main adsorption tanks 4 and 5.

<Method for Producing Nitrogen Gas>

Next is a description of a method for producing nitrogen gas according to the second embodiment.

The method for producing nitrogen gas according to the second embodiment is a method that involves repeating a pressurization and adsorption step, a depressurization and equalization step, a depressurization and regeneration step, and a pressurization and equalization step.

The method for producing nitrogen gas using the device 1 for producing nitrogen described above is described below in further detail with reference to FIG. 4 and the aforementioned Table 1.

FIG. 4A, FIG. 4B, FIG. 4C and FIG. 4D are diagrams illustrating the steps of an operation 1, an operation 2, an operation 3 and an operation 4 respectively, and in these figures, arrows indicate the direction of gas flow, and the bold lines indicate the lines through which the gas is flowing.

Figure 4A:
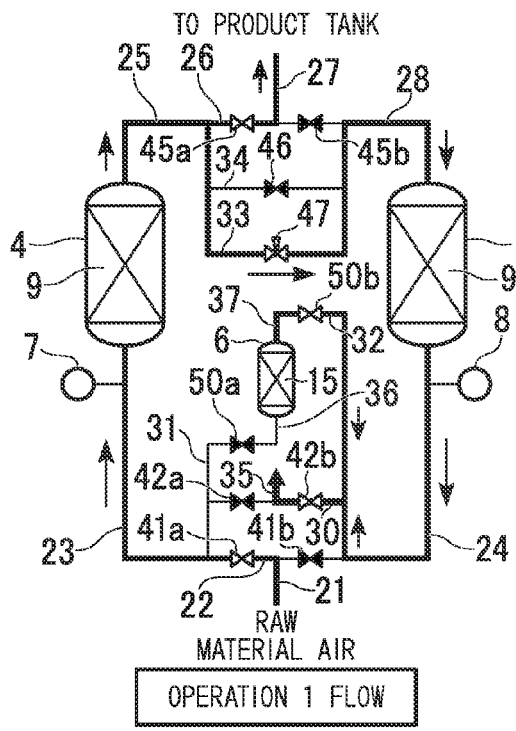
FIG. 4A is a process diagram showing the flow during an operation 1 of a method for producing nitrogen gas according to the second embodiment of the present invention.

In the operation 1 illustrated in FIG. 4A, the pressurization and adsorption step is performed in the first main adsorption tank 4, the depressurization and regeneration step is performed in the second main adsorption tank 5, and the depressurization and regeneration step is performed in the auxiliary adsorption tank 6.

In the operation 1, the inlet valve 41a, the outlet valve 45a, the exhaust valve 42b and the auxiliary adsorption tank outlet and inlet valve 50b are open, the flow rate of the gas flowing from the downstream side of the first main adsorption tank 4 to the downstream side of the second main adsorption tank 5 is controlled appropriately by the flow regulating valve 47, and the other on-off valves are closed.

Because the auxiliary adsorption tank outlet and inlet valve 50b is open, the gas inside the auxiliary adsorption tank 6 passes through the lines 37, 32, 30 and 35 and is released into the atmosphere, thereby reducing the pressure inside the auxiliary adsorption tank 6 (depressurization) and causing regeneration of the adsorbent 15.

Figure 4B:
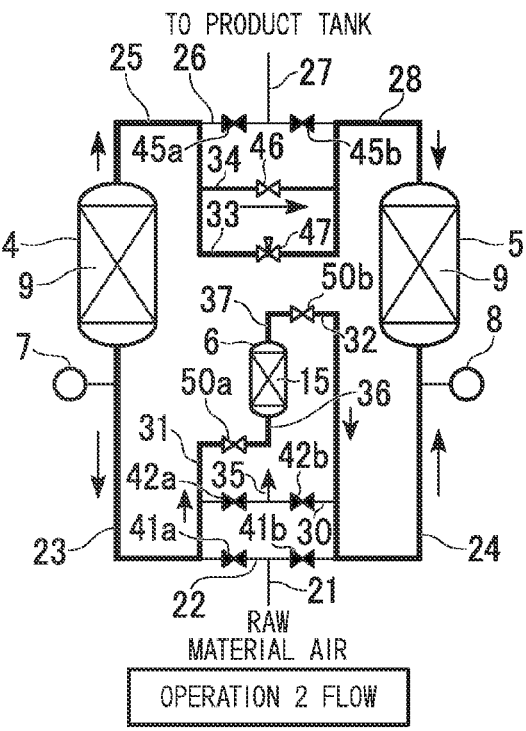
FIG. 4B is a process diagram showing the flow during an operation 2 of the method for producing nitrogen gas according to the second embodiment of the present invention.

Next, in the operation 2 illustrated in FIG. 4B, the depressurization and equalization step is performed in the first main adsorption tank 4, the pressurization and equalization step is performed in the second main adsorption tank 5, and the pressurization and adsorption step is performed in the auxiliary adsorption tank 6.

In this operation 2, the gas inside the first main adsorption tank 4, which has completed the pressurization and adsorption step, meaning the pressure inside the tank is relatively high, is recovered in the second main adsorption tank 5, which has completed the depressurization and regeneration step, meaning the pressure inside the tank is relatively low, and as a result, the first main adsorption tank 4 undergoes depressurization, while the second main adsorption tank 5 and the auxiliary adsorption tank 6 are pressurized.

Figure 4C:
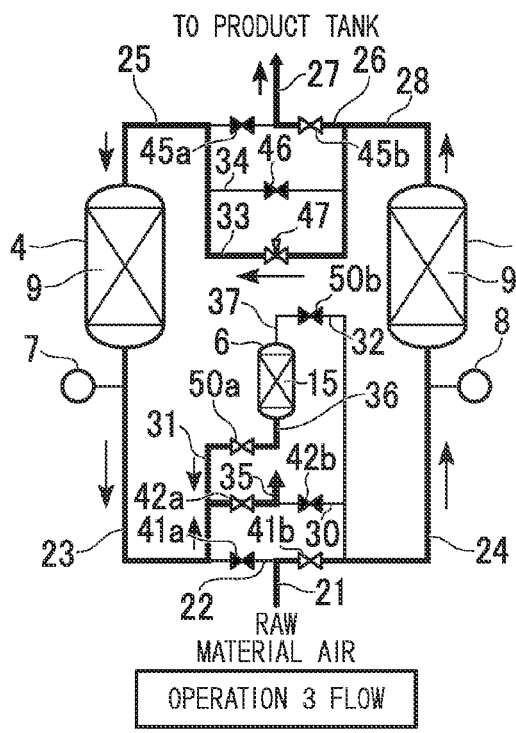
FIG. 4C is a process diagram showing the flow during an operation 3 of the method for producing nitrogen gas according to the second embodiment of the present invention.

Next is a description of the operation 3 illustrated in FIG. 4C. In the operation 3, the roles of the first main adsorption tank 4 and the second main adsorption tank 5 are reversed from the operation 1, so that the depressurization and regeneration step is performed in the first main adsorption tank 4, the pressurization and adsorption step is performed in the second main adsorption tank 5, and the depressurization and regeneration step is performed in the auxiliary adsorption tank 6.

In the operation 3, the inlet valve 41*b*, the outlet valve 45*b*, the exhaust valve 42*a*, and the auxiliary adsorption tank outlet and inlet valve 50*a* are open, and the other on-off valves are closed.

Figure 4D:
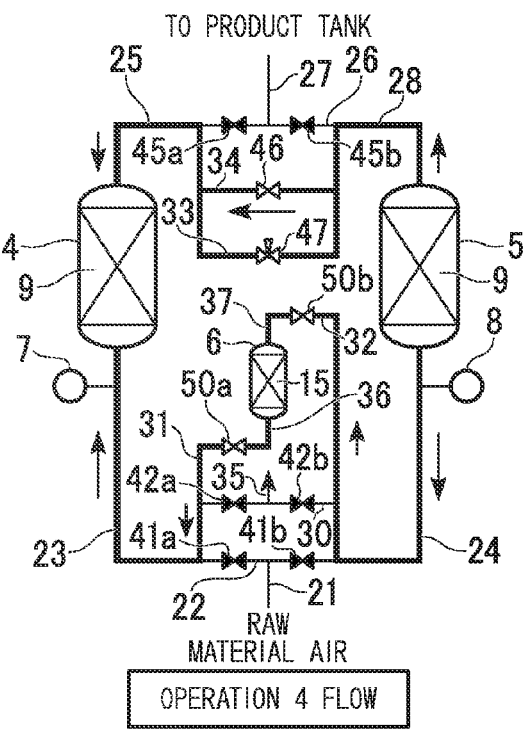
FIG. 4D is a process diagram showing the flow during an operation 4 of the method for producing nitrogen gas according to the second embodiment of the present invention.

Next is a description of the operation 4 illustrated in FIG. 4D. In the operation 4, the roles of the first main adsorption tank 4 and the second main adsorption tank 5 are reversed from the operation 2, so that the pressurization and equalization step is performed in the first main adsorption tank 4, the depressurization and equalization step is performed in the second main adsorption tank 5, and the pressurization and adsorption step is performed in the auxiliary adsorption tank 6.

In this operation 4, the gas inside the second main adsorption tank 5, which has completed the pressurization and adsorption step, meaning the pressure inside the tank is relatively high, is recovered in the first main adsorption tank 4, which has completed the depressurization and regeneration step, meaning the pressure inside the tank is relatively low, and as a result, the second main adsorption tank 5 undergoes depressurization, while the first main adsorption tank 4 and the auxiliary adsorption tank 6 are pressurized.

In the operation 4, the auxiliary adsorption tank outlet and inlet valves 50*a* and 50*b*, and the pressure equalizing valve 46 are open, and the other on-off valves are closed.

Because the pressure equalizing valve 46 is open, the gas inside the second main adsorption tank 5 passes from the downstream side of the second main adsorption tank 5, through the lines 28, 34 and 25, and into the downstream side of the first main adsorption tank 4.

Because the flow rate is regulated by the flow regulating valve 47, the majority of the gas introduced into the first main adsorption tank 4 does not pass through the line 33, but rather passes through the line 34.

Furthermore, because the auxiliary adsorption tank outlet and inlet valves 50*a* and 50*b* are open, the gas inside the second main adsorption tank 5 also flows from the upstream side of the second main adsorption tank 5, via the lines 24 and 32, through the auxiliary adsorption tank 6, and then via the lines 36, 31 and 23 into the upstream side of the first main adsorption tank 4.

In a similar manner to the operation 2, by introducing the recovered gas discharged from the upstream side of the second main adsorption tank 5 into the auxiliary adsorption tank 6, the auxiliary adsorption tank 6 is pressurized, and the oxygen within the low-purity nitrogen gas is adsorbed by the adsorbent 15 packed inside the auxiliary adsorption tank 6, thereby reducing the oxygen concentration.

As a result, the recovered gas discharged from the auxiliary adsorption tank 6 and introduced at the upstream side of the first main adsorption tank 4 becomes a nitrogen gas of high purity, meaning contamination of the first main adsorption tank 4 by low-purity nitrogen gas can be prevented.

In the embodiment described above, instead of using the flow regulating valve 47, a flow regulation method that involves narrowing the orifice or line diameter may also be used.

While the present invention has been described above based on embodiments, the invention is in no way limited by the above embodiments, and various modifications are possible without departing from the scope of the present invention.

For example, in the embodiments described above, a configuration was described in which the pressure equalization steps were performed by connecting the first main adsorption tank 4 and the second main adsorption tank 5 at their respective upstream sides, but the present invention is not limited to this particular configuration. The effect obtained by providing the auxiliary adsorption tank can also be achieved when the pressure equalization steps are performed by connecting an intermediate section (namely, a position intermediate between the upstream side and the downstream side) of the first main adsorption tank 4 and the upstream section of the second main adsorption tank 5 with a line, thereby forming a line connecting the first main adsorption tank 4 and the second main adsorption tank 5.

Moreover, the auxiliary adsorption tank 6 may also be provided in the line connecting the intermediate section of the first main adsorption tank 4 and the upstream section of the second main adsorption tank 5.

Further, the auxiliary adsorption tank 6 may also be provided in the line connecting the downstream side of the first main adsorption tank 4 and the downstream side of the second main adsorption tank 5. However, the nitrogen gas discharged from the downstream side of each of the main adsorption tanks 4 and 5 is of comparatively high purity, and therefore even if this gas is introduced into the auxiliary adsorption tank 6 and subjected to oxygen adsorption, a large effect cannot be obtained. Although some advantage is obtained compared with the case where no auxiliary adsorption tank 6 is used, the improvement in the yield ratio is only approximately 0.5%.

Further, regeneration of the auxiliary adsorption tank is not limited to the use of the lines described above. A line configuration in which the regeneration gas for the main adsorption tanks also flows through the auxiliary adsorption tank can also be used, and the effect of providing the auxiliary adsorption tank is not lost in this case.

Furthermore, in the embodiments described above, the case of two main adsorption tanks was described, but there is no limitation on the number of adsorption tanks. Even in the case of a single tank device provided with a pressure equalization tank, the auxiliary adsorption tank can be provided in the connecting line between the adsorption tank and the pressure equalization tank.

Further, a description was provided for the case in which nitrogen gas was produced from a raw material gas (air), but the combination of the raw material gas and the product gas is not necessarily limited to this particular combination, and the invention can be applied broadly to any gas separation method which uses an adsorbent to recover an easily adsorbed component and a poorly adsorbed component from a raw material gas.

The present invention is described below using a series of examples. However, the present invention is in no way limited by the following examples.

EXAMPLE 1

Figure 9:
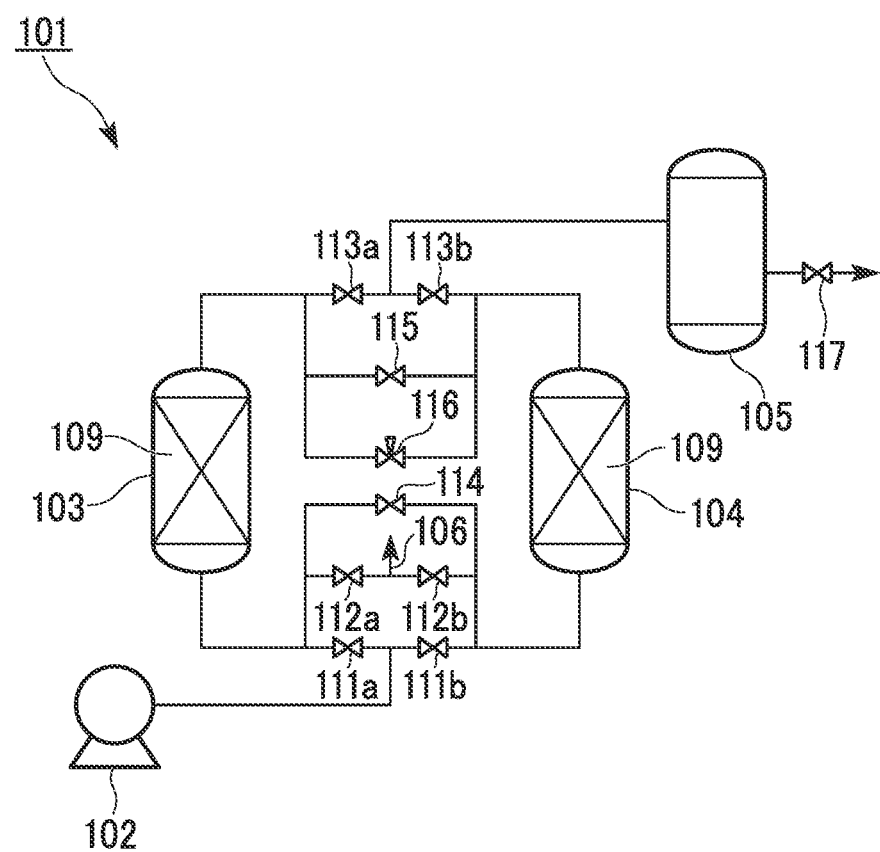
FIG. 9 is a system diagram illustrating an outline of a conventional device for producing nitrogen gas.

In Example 1, the difference in performance caused by the presence or absence of an auxiliary adsorption tank was investigated. Specifically, the yield (nitrogen gas yield) and the productivity (nitrogen gas productivity) were investigated using the device for producing nitrogen gas according to the present invention illustrated in FIG. 1, and the typical device for producing nitrogen gas illustrated in FIG. 9.

The auxiliary adsorption tank used in this example had a volume of 1/10th that of the main adsorption tanks, and the adsorbent packed in the auxiliary adsorption tank was an adsorbent A indicated in the test examples described below.

The operating conditions for each of the steps included a maximum pressure of approximately 0.7 MPaG in the adsorption step, a pressurization adsorption step time (depressurization regeneration step time) of 56 seconds, and a pressure equalization step time of 4 seconds.

In the typical device for producing nitrogen gas, the depressurization side and the pressurization side were substantially the same pressure in the pressure equalization step.

In the device for producing nitrogen gas of the present invention, which was provided with the auxiliary adsorption tank, the pressure inside the auxiliary adsorption tank increased rapidly to approximately 0.5 MPaG at the start of the pressure equalization step, and then gradually decreased while displaying substantially the same value as the pressure of the adsorption tank undergoing the depressurization equalization step until the completion of the pressure equalization step. At the completion of the pressure equalization step, a pressure difference of approximately 0.02 to 0.04 MPa was observed between the two tanks.

Further, when one of the main adsorption tanks entered the depressurization regeneration step, the pressure inside the auxiliary adsorption tank rapidly decreased to atmospheric pressure together with the pressure of the main adsorption tank.

The yield was determined as [product nitrogen gas flow rate/raw material air flow rate], and the productivity was determined as [product nitrogen gas flow rate/total amount of adsorbent in main adsorption tanks] (namely, the combined amount of the adsorbent packed into the two main adsorption tanks, but excluding the adsorbent packed in the auxiliary adsorption tank). The results are illustrated in FIG. 5A and FIG. 5B.

In each figure, the vertical axis represents a relative value, wherein a value of 1 was assigned to the yield or productivity for the case when the oxygen concentration in the product gas was 100 ppm (volume) and no auxiliary adsorption tank was used.

Figure 5A:
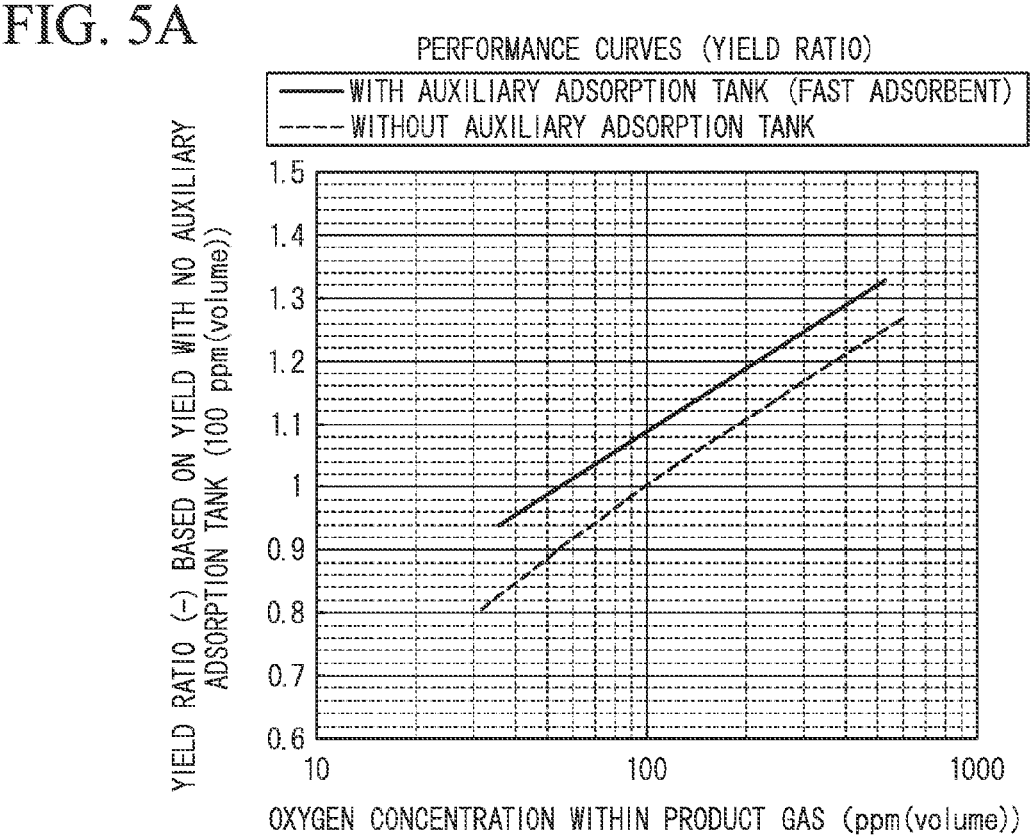
FIG. 5A is graph illustrating the relationship between the yield and the oxygen concentration within the product gas in the presence or absence of an auxiliary adsorption tank.
Figure 5B:
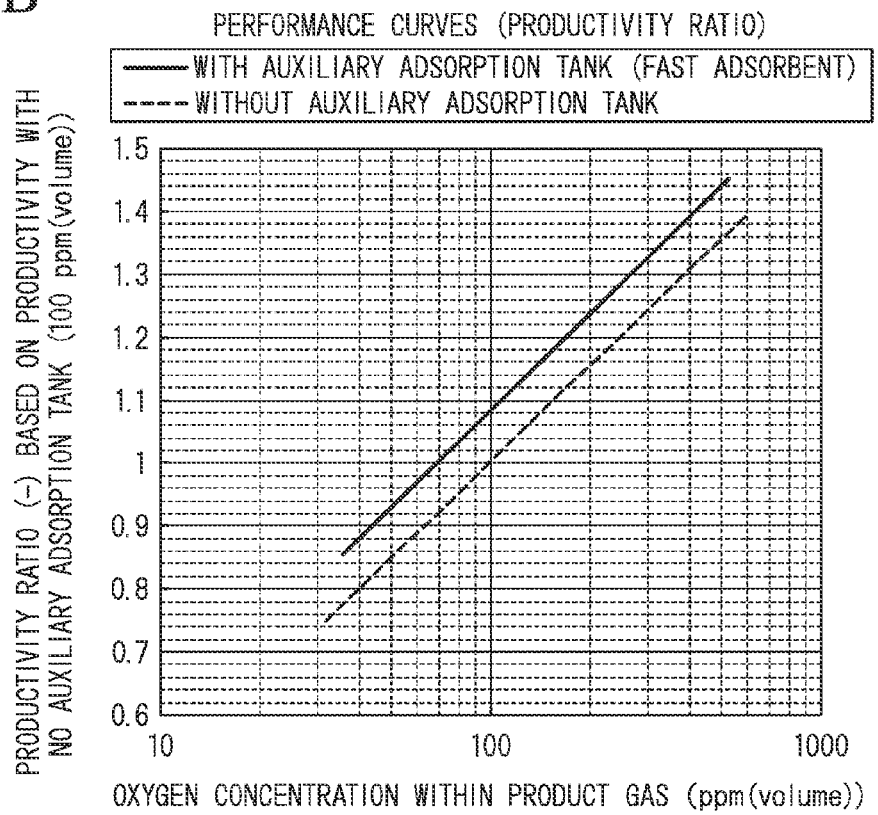
FIG. 5B is graph illustrating the relationship between the productivity and the oxygen concentration within the product gas in the presence or absence of an auxiliary adsorption tank.

As illustrated in FIG. 5A and FIG. 5B, when the oxygen concentration in the product gas was 100 ppm (volume), the yield when the auxiliary adsorption tank was used improved approximately 9.0% compared with the case when no auxiliary adsorption tank was used. Further, when the auxiliary adsorption tank was used, the productivity improved approximately 8.0% compared with the case when no auxiliary adsorption tank was used.

EXAMPLE 2

Figure 6A:
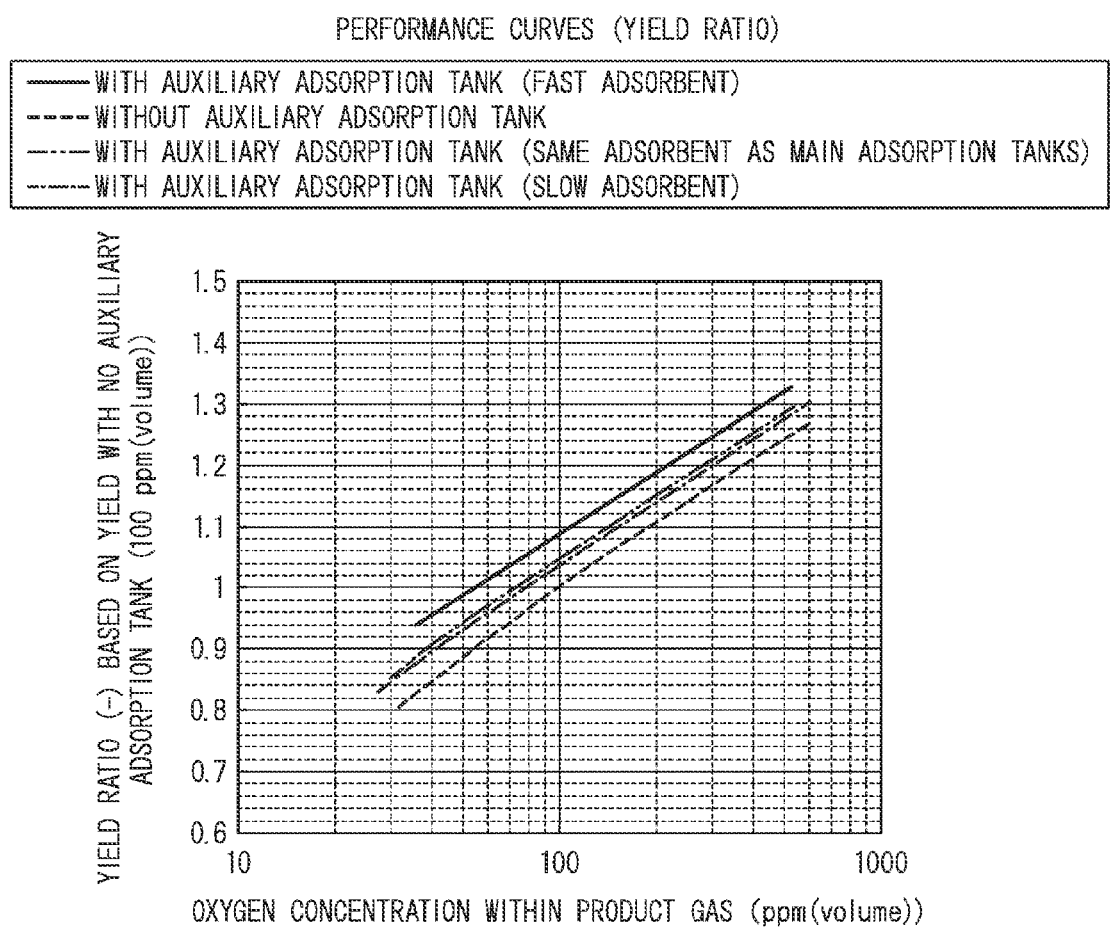
FIG. 6A is a graph illustrating the relationship between the yield and the oxygen concentration within the product gas for various adsorbents of different adsorption rates packed in the auxiliary adsorption tank.
Figure 6B:
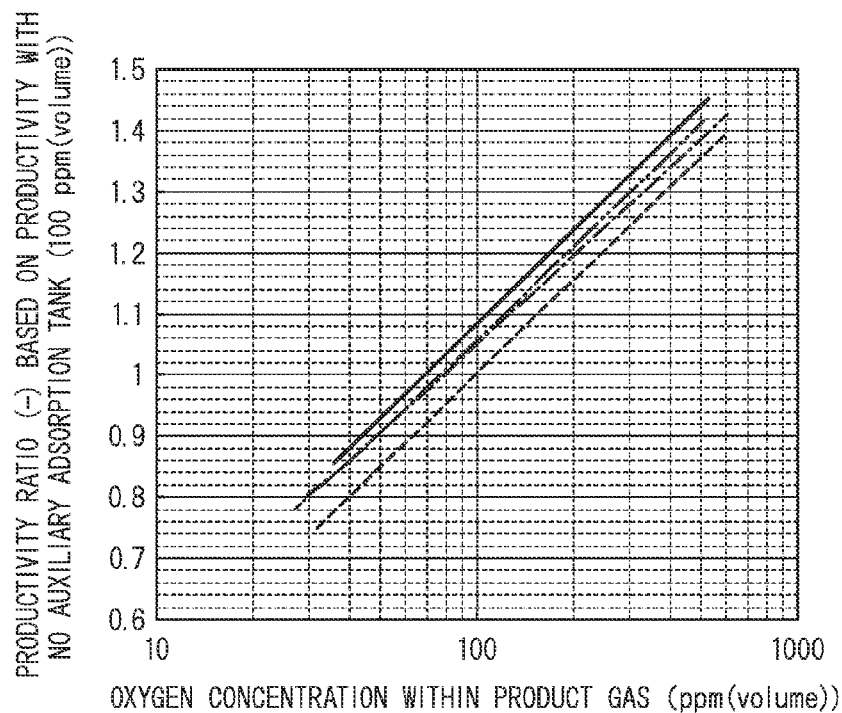
FIG. 6B is a graph illustrating the relationship between the productivity and the oxygen concentration within the product gas for various adsorbents of different adsorption rates packed in the auxiliary adsorption tank.

In Example 2, the use of carbon molecular sieves having different adsorption rates for the adsorbent packed in the auxiliary adsorption tank was investigated. Specifically, using an auxiliary adsorption tank having a volume of 1/10th that of the main adsorption tanks, the yield and the productivity were investigated for those cases where, compared with the adsorbent used in the main adsorption tanks, the adsorbent in the auxiliary adsorption tank had the same properties, had a faster adsorption rate, or had a slower adsorption rate. The results are illustrated in FIG. 6A and FIG. 6B. Here, the adsorbent having a faster adsorption rate, the adsorption having the same properties, and the adsorbent having a slower adsorption rate correspond respectively with the adsorbent A, the adsorbent B and the adsorbent C indicated in the test examples described below.

In FIG. 6A and FIG. 6B, for the purpose of comparison, the results are also shown for the case in which no auxiliary adsorption tank was used.

As illustrated in FIG. 6A and FIG. 6B, in graphs comparing the yield and the productivity, if a comparison is made for the case where the oxygen concentration in the product gas is 100 ppm (volume), then even in the case where an adsorbent having a slower adsorption rate than that of the main adsorption tanks was used, the test values were superior to those for the case where no auxiliary adsorption tank was used. This tendency becomes clearer as the adsorption rate increases.

EXAMPLE 3

In Example 3, the performance relative to the volume of the auxiliary adsorption tank was investigated. Specifically, the yield and the productivity were investigated for those cases where the volume of the auxiliary adsorption tank was 1/5th, 1/7th, 1/10th, 1/20th and 1/40th that of the main adsorption tanks. The adsorbent packed in the auxiliary adsorption tank was the adsorbent A indicated in the test examples described below. The results are illustrated in FIG. 7.

Figure 7:
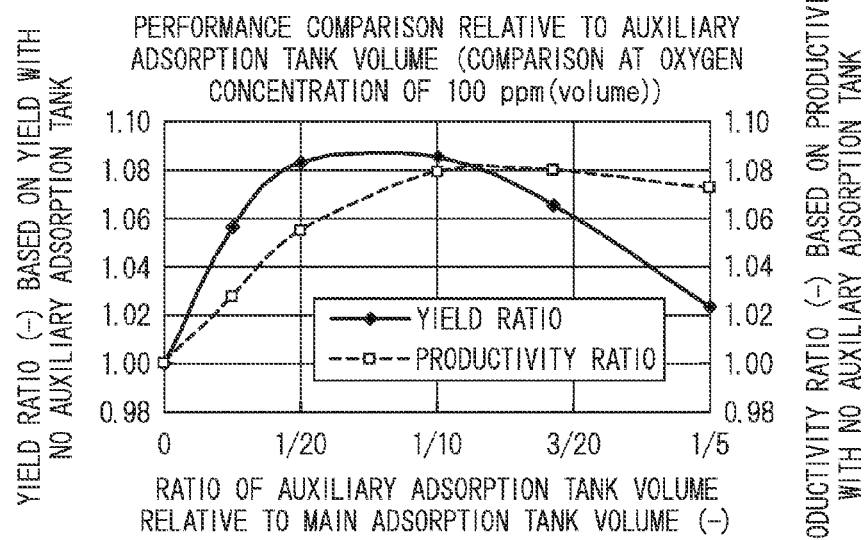
FIG. 7 is a graph illustrating the relationship between the yield and the productivity for auxiliary adsorption tanks of different volume.

As illustrated in FIG. 7, it was evident that, regardless of the volume of the auxiliary adsorption tank, the performance improved compared with the case where no auxiliary adsorption tank was used.

At the very least, it was found that when the volume of the auxiliary adsorption tank was at least 1/40th but not more than 1/5th the volume of the main adsorption tanks, the performance was superior to the case where no auxiliary adsorption tank was used, and therefore preferable. Further, FIG. 7 illustrates the performance for the case where the nitrogen concentration in the product gas is 99.99% (volume), but similar improvements in the performance when the auxiliary adsorption tank was provided were obtained for nitrogen concentrations within a range from 99% (volume) to 99.999% (volume).

Because increasing the size of the auxiliary adsorption tank also produces adverse effects such as increasing equipment costs, and reducing the amount of gas recovered to the main adsorption tanks due to the increase in the amount of gas retained inside the auxiliary adsorption tank, these factors should also be considered when determining the size of the auxiliary adsorption tank.

(Test Examples)

In these test examples, the adsorption rates of adsorbents were investigated using a constant volume adsorption rate measuring device (Belsorp, manufactured by BEL Japan Inc.). Specifically, oxygen gas and nitrogen gas were independently brought into contact with the adsorbent, and the reduction in pressure was measured relative to the time elapsed.

Figure 8:
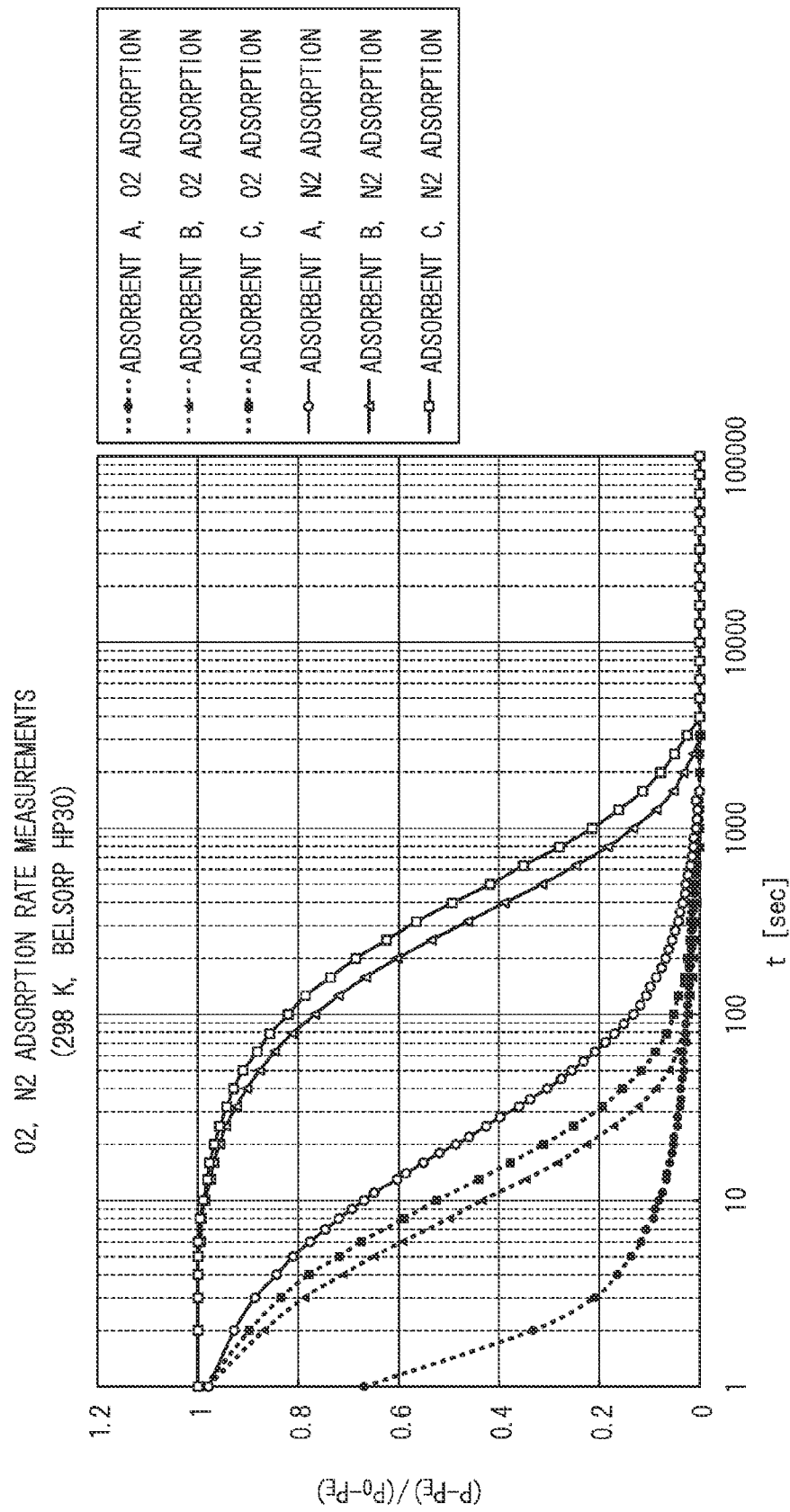
FIG. 8 is a graph illustrating the results of measuring the adsorption rates of adsorbents.

The results are illustrated in FIG. 8. In FIG. 8, the horizontal axis represents the adsorption time, and the vertical axis represents the relativized value of the difference between the pressure (P) at an arbitrary time and the equilibrium pressure ($P_E$), relative to the difference between the initial pressure ($P_0$) and the equilibrium pressure ($P_E$), namely $(P-P_E)/(P_0-P_E)$.

The difference between $(P-P_E)/(P_0-P_E)=1$ and the curve corresponds with the amount of gas adsorbed by each adsorbent. In other words, when the adsorbent first makes contact with the gas (t=0), the pressure (P) is the same as the initial pressure ($P_0$), and the value of $(P-P_E)/(P_0-P_E)=1$. As time elapses and the amount of adsorption increases, the value of $(P-P_E)/(P_0-P_E)$ for each adsorbent gradually decreases, and the point where the pressure (P) reaches the equilibrium pressure ($P_E$) indicates a state of adsorption saturation, where $(P-P_E)/(P_0-P)=0$.

In FIG. 8, the curves further toward the left side indicate a reduction in pressure in a shorter period of time, and therefore a faster rate of adsorption. Generally, the adsorption rate for oxygen and the adsorption rate for nitrogen exhibited paired adsorption properties. In other words, an adsorbent having a fast oxygen adsorption rate also exhibited a relatively fast nitrogen adsorption rate. According to the results in FIG. 8, the adsorbent A had the fastest adsorption rate, followed in sequence by the adsorbent B and the adsorbent C.

For the adsorbent A, if the amounts of adsorption at the completion of the pressurization equalization step described in Example 1 (namely, 4 seconds after the start of the pressurization equalization step) are read from FIG. 8, then the amount of oxygen adsorption is more than 80% of the equilibrium adsorption amount, whereas the amount of nitrogen adsorption is only just over 10%.

On the other hand, if the values for the adsorbent C which has the slowest adsorption rate are read from FIG. 8, then the amount of oxygen adsorption at t=4 seconds is more than 20% of the equilibrium adsorption amount, but the amount of nitrogen adsorption is substantially zero.

In Example 2, the adsorbent which had a faster adsorption rate than the adsorbent packed in the main adsorption tanks, the adsorbent which had the same properties, and the adsorbent which had a slower adsorption rate refer to the adsorbent A, the adsorbent B and the adsorbent C respectively from these test examples.

In Example 2, the case in which the auxiliary adsorption tank was provided yielded improved performance for the device for producing nitrogen, and packing the auxiliary adsorption tank with an adsorbent having a fast adsorption rate yielded superior effects for the present invention.

Accordingly, based on the results of Example 2 and the test examples, the following recommendation is provided. That is, packing the auxiliary adsorption tank with an adsorbent having a fast adsorption rate enhances the effect of providing the auxiliary adsorption tank, and if an adsorbent can be acquired for which the adsorption rate is high and the difference in the adsorption rates for oxygen and nitrogen is comparatively large, then the effects of the auxiliary adsorption tank of the present invention can be further enhanced.

INDUSTRIAL APPLICABILITY

A PSA method for producing nitrogen gas, a gas separation method and a device for producing nitrogen gas can be provided which, compared with conventional technology, exhibit improvements in the yield and the productivity, a reduction in the size of the device, and improved power conservation.

DESCRIPTION OF THE REFERENCE SIGNS

1: Device for producing nitrogen gas
2: Compressor
3: Product tank
4: First main adsorption tank
5: Second main adsorption tank
6: Auxiliary adsorption tank
9, 15: Adsorbent
21, 22, 23, 24, 25, 26, 27, 28, 29, 30, 31, 32, 33, 34: Line
41a, 41b: Inlet valve
42a, 42b: Exhaust valve
43a, 43b: Auxiliary adsorption tank inlet valve
44a, 44b: Auxiliary adsorption tank outlet valve
45a, 45b: Outlet valve
46: Pressure equalizing valve
47: Flow regulating valve
50a, 50b: Auxiliary adsorption tank outlet and inlet valve

The invention claimed is:

1. A method for producing nitrogen gas from a raw material gas using a PSA system, the method comprising:
using a second adsorbent, which is packed in an auxiliary adsorption tank provided in a line connecting two main adsorption tanks packed with a first adsorbent and has a faster oxygen adsorption rate than the first adsorbent, to reduce an oxygen concentration within a gas discharged from a main adsorption tank performing a depressurization equalization step, and then introducing the gas into a main adsorption tank performing a pressurization equalization step,
wherein the line connecting the two main adsorption tanks is a line connecting either upstream sides of each of the main adsorption tanks, or an intermediate section of one main adsorption tank and an upstream side of the other main adsorption tank.

2. The method for producing nitrogen gas according claim 1, wherein the first adsorbent packed in the main adsorption tanks is carbon molecular sieves.

3. The method for producing nitrogen gas according to claim 1, wherein the second adsorbent packed in the auxiliary adsorption tank is carbon molecular sieves.

4. A method for producing nitrogen gas from a raw material gas using a PSA system, the method comprising:
a pressure equalization step of connecting two main adsorption tanks, each packed with an adsorbent, via a line that connects either upstream sides of each of the main adsorption tanks or an intermediate section of one main adsorption tank and an upstream side of the other main adsorption tank, and using the line to achieve pressure equalization by discharging a gas from one main adsorption tank into the other main adsorption tank, wherein
in the pressure equalization step, the gas discharged from one main adsorption tank is subjected to a reduction in oxygen concentration by oxygen removal means before entering the other main adsorption tank.

5. A method for separating gas, which uses a raw material gas containing an easily adsorbed component which adsorbs readily to a first adsorbent and a second adsorbent and a poorly adsorbed component which exhibits poor adsorption to the adsorbents, and recovers the easily adsorbed component and the poorly adsorbed component from the raw material gas, wherein
the method comprises a pressure equalization step of connecting two main adsorption tanks, which are packed with the first adsorbent, via a line, and using the line to achieve pressure equalization by discharging a gas from one main adsorption tank into the other main adsorption tank,
in the pressure equalization step, the gas discharged from one main adsorption tank is subjected to a reduction in the easily adsorbed component by the second adsorbent, which is packed in an auxiliary adsorption tank provided in the line and has a faster adsorption rate of the easily adsorbed component than the first adsorbent, and is then introduced into the other main adsorption tank, and the line connecting the two main adsorption tanks is a line connecting either upstream sides of each of the main adsorption tanks, or an intermediate section of one main adsorption tank and an upstream side of the other main adsorption tank.

6. A device for producing nitrogen gas from a raw material gas using a PSA system, the device comprising:
a compressor which pressurizes the raw material gas,
two main adsorption tanks packed with a first adsorbent, and
an auxiliary adsorption tank which is provided in a line connecting the two main adsorption tanks and is packed with a second adsorbent for reducing an oxygen concentration within a gas, wherein
an oxygen adsorption rate of the second adsorbent is faster than an oxygen adsorption rate of the first adsorbent, and
the line connecting the two main adsorption tanks is a line connecting either upstream sides of each of the main adsorption tanks, or an intermediate section of one main adsorption tank and an upstream side of the other main adsorption tank.

7. The device for producing nitrogen gas according to claim 6, wherein the first adsorbent packed in the main adsorption tanks is carbon molecular sieves.

8. The device for producing nitrogen gas according to claim 6, wherein the second adsorbent packed in the auxiliary adsorption tank is carbon molecular sieves.

9. The method for producing nitrogen gas according to claim 4, wherein the volume of the auxiliary adsorption tank is at least 1/40th but not more than 1/5th the volume of the main adsorption tanks.

10. The method for producing nitrogen gas according to claim 4, wherein the volume of an auxiliary adsorption tank, inside which the oxygen removal means are packed, is at least 1/40th but not more than 1/5th the volume of the main adsorption tanks.

11. The method for separating gas according to claim 5, wherein the volume of the auxiliary adsorption tank is at least 1/40th but not more than 1/5th the volume of the main adsorption tanks.

12. The device for producing nitrogen gas according to claim 6, wherein the volume of the auxiliary adsorption tank is at least 1/40th but not more than 1/5th the volume of the main adsorption tanks.

* * * * *